(12) United States Patent
Despres (10) Patent No.: US 10,527,076 B2
(45) Date of Patent: Jan. 7, 2020

(54) CLIP FOR BUNDLED ARTICLES

(71) Applicant: GCK Products, LLC, Rockford, MI (US)

(72) Inventor: Michael J. Despres, Rockford, MI (US)

(73) Assignee: GCK Products, LLC, Rockford, MI (US)

( * ) Notice: Subject to any disclaimer, the term of this patent is extended or adjusted under 35 U.S.C. 154(b) by 31 days.

(21) Appl. No.: 15/907,872

(22) Filed: Feb. 28, 2018

(65) Prior Publication Data

US 2018/0245612 A1 Aug. 30, 2018

Related U.S. Application Data

(60) Provisional application No. 62/464,421, filed on Feb. 28, 2017.

(51) Int. Cl.
| | | |
|---|---|---|
| *F16B 2/24* | (2006.01) | |
| *B42F 1/00* | (2006.01) | |
| *B65D 67/02* | (2006.01) | |

(52) U.S. Cl.
CPC .............. *F16B 2/245* (2013.01); *B42F 1/006* (2013.01); *B65D 67/02* (2013.01)

(58) Field of Classification Search
CPC ............. Y10T 24/44239; Y10T 24/393; Y10T 24/44393; Y10T 24/44453; Y10T 24/44376; Y10T 24/44274; Y10T 24/44385; A61M 5/1418
USPC ............................ D11/215; D19/65; 24/67.5
See application file for complete search history.

(56) References Cited

U.S. PATENT DOCUMENTS

| | | | | |
|---|---|---|---|---|
| 5,533,236 | A  * | 7/1996 | Tseng ...................... | B42F 1/006 24/67 R |
| 7,770,263 | B2 * | 8/2010 | Thomson ................. | A45C 1/06 24/558 |
| 8,104,149 | B1   | 1/2012 | McGarity | |
| 2015/0128382 | A1 | 5/2015 | Klein | |
| 2015/0342313 | A1 | 12/2015 | Antinone | |

OTHER PUBLICATIONS

Partial European Search Report and Written Opinion for corresponding European Application No. EP18158816, dated Nov. 21, 2018.

* cited by examiner

*Primary Examiner* — Jack W Lavinder
(74) *Attorney, Agent, or Firm* — Gardner, Linn, Burkhart & Ondersma LLP (57) ABSTRACT

A clip includes a resilient clip body and a pair of lever arms for opening and closing the clip body, which defines a chamber for retaining or bundling loose articles, such as cords. The clip body has a pair of lever contact zones disposed between a forward end portion and an arcuate rear portion, each of these zones and portions cooperating with the others to define the article-retaining chamber. The arcuate rear portion has a concave-inward shape and the forward end portion defines an opening at least when opened in response to an inward compressive force applied to the lever arms at a location spaced rearwardly from the lever contact zones of the clip body. Optionally, the resilient clip body defines an opening at the forward end portion, even when it is in a relaxed state, such as to facilitate selective removal of bundled articles from the chamber.

20 Claims, 7 Drawing Sheets

CLIP FOR BUNDLED ARTICLES

CROSS REFERENCE TO RELATED APPLICATION

The present application claims the benefit of U.S. provisional application Ser. No. 62/464,421, filed Feb. 28, 2017, which is hereby incorporated herein by reference in its entirety.

FIELD OF THE INVENTION

The present invention relates to devices for securing loose articles.

BACKGROUND OF THE INVENTION

Various types of securing articles are designed for securing bundled or stacked articles ranging from paper to rope, cord or wire. Such securing articles include, for example, paper clips made of metal wire, sheet metal, or resinous plastic, wire ties, plastic cable "zip ties", straps lines with hook-and-loop fastener material, and the like.

SUMMARY OF THE INVENTION

The present invention provides a clip for securing loose articles such as wires or cables, rope, cord, paper, and the like, and may also permit attaching such loose articles to other surfaces, such as for routing cords or cables through a work area. The clip is reusable and facilitates one-handed operation for bundling loose articles, unbundling loose articles, selectively unbundling a subset of articles from a bundles set, and attaching or detaching bundled articles to other surfaces. In addition to allowing a user to quickly organize wires associated with electronic devices, the clips have myriad uses for at least temporarily securing products or articles in household, business, industrial, trade show, vehicular, and hobby settings and applications.

According to one form of the present invention, a clip includes a resilient clip body and a pair of lever arms that are operable to open and close the clip body. The clip body has a forward end portion, an arcuate rear portion, and a pair of lever contact zones located between the forward end portion and the arcuate rear portion. The arcuate rear portion has a concave-inward shape and the forward end portion defines an opening at least when opened in response to compressive force applied to the lever arms at a location spaced rearwardly from the lever contact zones of the clip body. An article retaining chamber is defined by at least the arcuate rear portion and the pair of lever contact zones.

In one aspect, a central region of the arcuate rear portion is located rearwardly of both of the lever contact zones.

In another aspect, the article-retaining chamber is in the shape of a horizontal cylindrical segment. Optionally, the clip body is substantially symmetrical about a central plane, and the arcuate rear portion defines a radius of curvature that is greater than one-half of the maximum distance that the arcuate rear portion is spaced from the central plane. Further optionally, the lever contact zones lie substantially inside a cylinder traced through the horizontal cylindrical segment of the arcuate rear portion.

In yet another aspect, the lever contact zones are substantially planar, with respective planes extending through the lever contact zones intersecting at a location that is spaced in front of a forward-most surface of the resilient clip body.

In still another aspect, a first distance is defined between the forward-most surface of the clip body and the location where the respective planes extending through the lever contact zones intersect, and a second distance is defined between a rearward-most surface of the clip body and the forward-most surface of the clip body, wherein the first distance is at least one-half of the second distance.

In a further aspect, the forward end portion includes a pair of loops defining rounded openings for receiving proximal end portions of respective ones of the pair of lever arms. Optionally, the planes extending through the lever contact zones intersect central regions of respective ones of the rounded openings.

In a still further aspect, each of the lever arms contacts the clip body along substantially the full length of each of the respective ones of the lever contact zones at least when the clip body is in the closed configuration. Optionally, each of the lever arms contacts the clip body along substantially the full length of each of the respective ones of the lever contact zones when the clip body is both the open configuration and the closed configuration.

In another aspect, when the forward end portion of the clip body is in the closed configuration and the lever arms are unloaded, respective sides of the clip body at the forward end portion are spaced apart from one another and define a gap that provides access to the article-retaining chamber when the clip body is in a relaxed state.

Optionally, first inwardly-facing transition angles are defined between the arcuate rear portion and each of the lever contact zones, wherein the first inwardly-facing transition angles are greater than 90-degrees.

In yet another aspect, the clip body further includes an angled clip body segment positioned forwardly of each of the lever contact zones, with second inwardly-facing transition angles defined between each of the lever contact zones and a respective one of the angled clip body segments, and the second inwardly-facing transition angles are greater than 90-degrees.

According to another form of the present invention, a clip for bundled articles includes a resilient clip body that defines an article-retaining chamber, and a pair of lever arms. The clip body has a forward end portion defining a gap when the body is in a relaxed state, while an arcuate rear portion of the clip body has a concave-inward shape. The gap defines a passageway to the article-retaining chamber. The lever arms each extend rearwardly in divergent directions, and have respective distal end portions extending rearwardly beyond the arcuate rear portion of the clip body. The lever arms are operable to move the forward end portion of the clip body to an open configuration upon application of an inwardly compressive force to the distal end portions of the lever arms, and the forward end portion of the clip body is resiliently biased to the relaxed state upon release of the inwardly compressive force.

In one aspect, the resilient clip body is made from resinous plastic.

In another aspect, the resilient clip body includes a middle region and a pair of edge regions on opposite sides of the middle region, wherein the middle region is thicker than the edge regions along at least the arcuate rear portion of the clip body.

In a further aspect, the lever arms are pivotably coupled to the forward end portion of the resilient clip body, and the resilient clip body includes a pair of lever contact zones disposed between the forward end portion and the arcuate rear portion. The lever arms contact the resilient clip body along respective ones of the lever contact zones. Optionally, the lever contact zones lie substantially inside a cylinder traced through a horizontal cylindrical segment of the arcuate rear portion.

Thus, the clip provides a device for organizing cords, cables, and other loose materials or articles, and may also be used for securing such materials or articles to other surfaces such as table edges or other articles. The clip may be installed and removed in a one-handed operation, and may also be configured to facilitate removal of a selected quantity of materials from the clip, while retaining a remainder in the clip, also in a substantially one-handed operation.

These and other objects, advantages, purposes and features of the present invention will become apparent upon review of the following specification in conjunction with the drawings.

DESCRIPTION OF THE PREFERRED EMBODIMENTS

Figure 6:
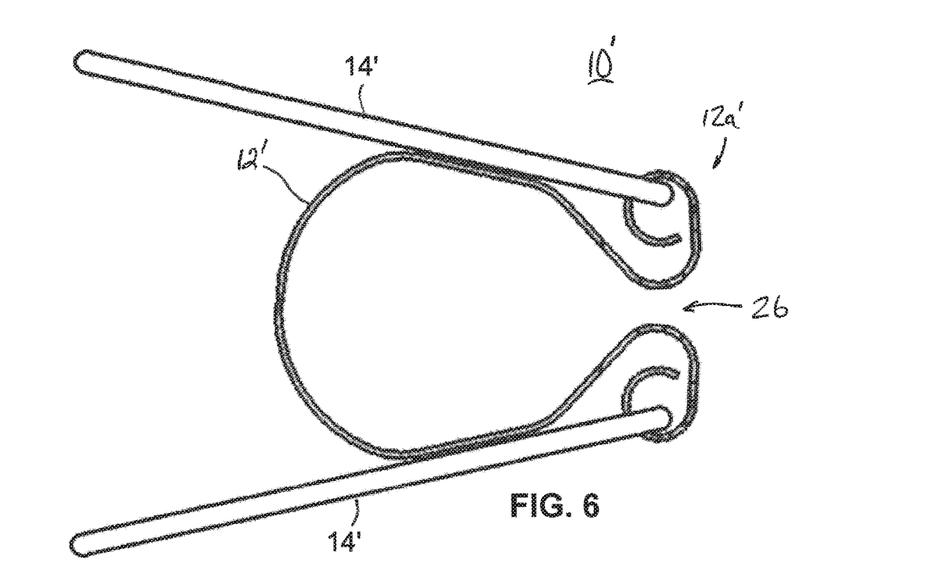
FIG. 6 is a right side elevation of another clip for bundled articles in accordance with the present invention.

Referring now to the drawings and the illustrative embodiments depicted therein, a clip 10 for bundled articles includes a resilient clip body 12 and a pair of lever arms 14 (FIGS. 1 and 2) for selectively opening the clip body 12. Clip body 12 has a front end portion 12a that is openable in response to a compressive force F (FIG. 1) applied to distal end portions 14a of respective lever arms 14, where the distal end portions 14a extend rearwardly from an arcuate rear end portion 12b of clip body 12. Opening front end portion 12a of clip body 12, such as in a manner generally corresponding to what is shown in FIG. 6, facilitates the insertion or removal of articles to be bundled together, and may also permit clip 10 to be secured to another article or surface, such as a table edge or substantially any desired material or surface that is sufficiently sized to be engaged by the clip 10.

Therefore, clip 10 can be used to secure articles such as loops of cord, rope, or wire, for example, and to maintain a length of such articles in an organized and substantially untangled manner, and may also be used to at least temporarily secure such articles to other surfaces. Various applications may include, for example, organizing headphone wires and charging cables for personal electronic devices, organizing and securing wires in temporary displays such as convention display booths and music and other performance venues including DJ stands, stages, and sound booths, in substantially any other work areas with wire routing needs, audio and/or video wiring in vehicles, holiday light strings, extension cords, appliance cords, trailer light wiring, securing clothing to hangers, providing a stand for holding a smart phone or other portable electronic device in an upright orientation, and the like.

Figures 1, 2:
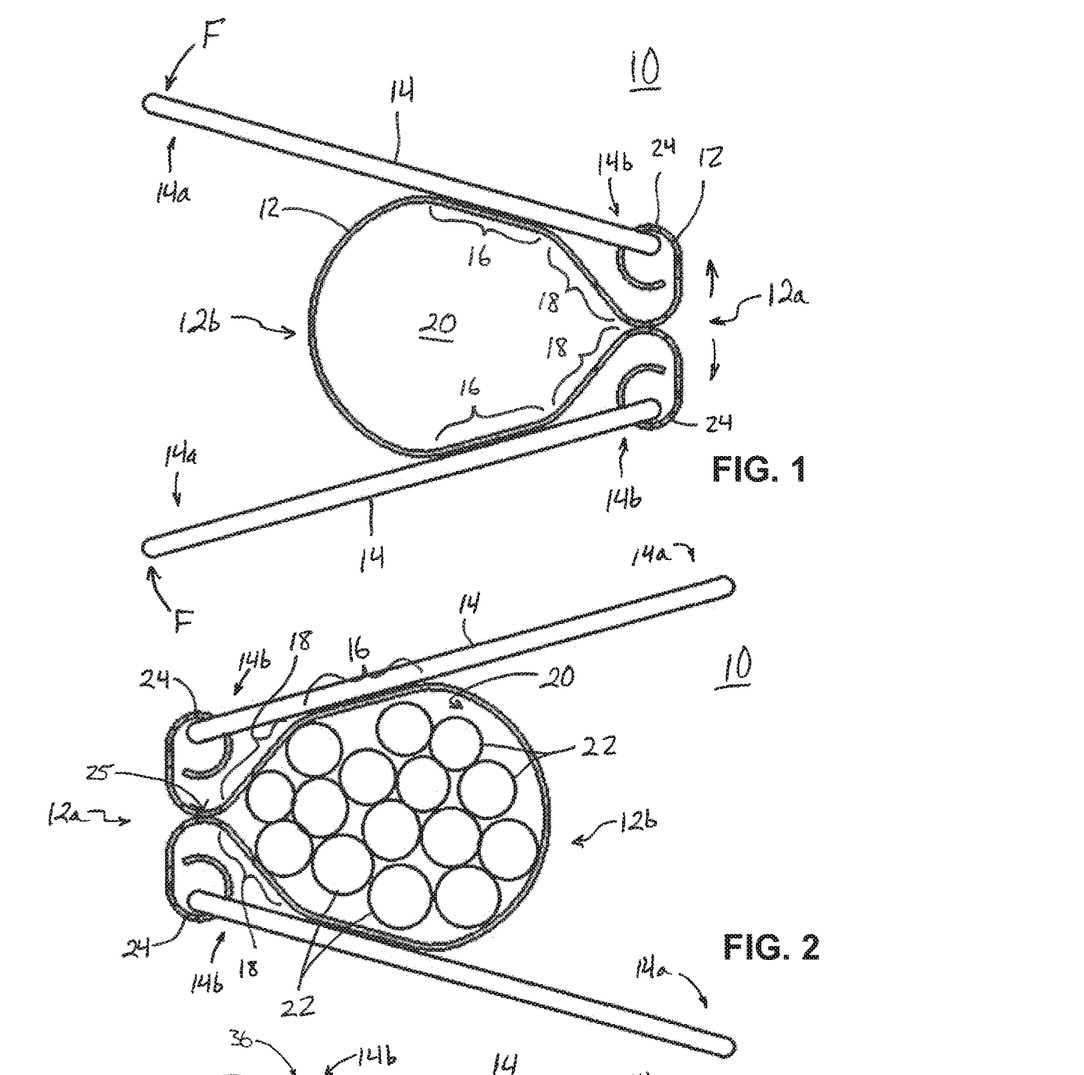
FIG. 1 is a right side elevation of a clip for bundled articles in accordance with the present invention.
FIG. 2 is a left side elevation of the clip of FIG. 1, shown with a plurality of wires or wire sections disposed in a retaining chamber thereof.
Figure 4:
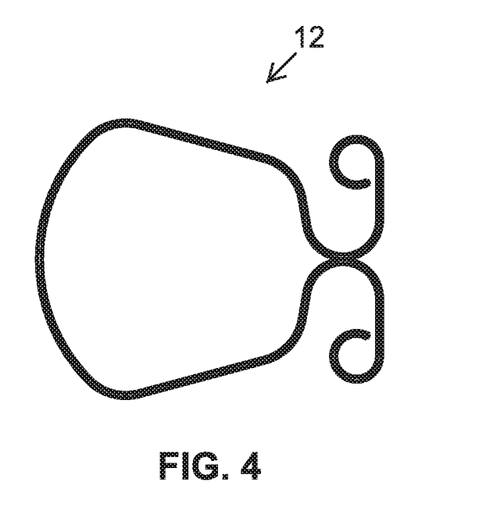
FIG. 4 is a right side elevation of the resilient clip body of the clip of FIG. 1.

In addition to front end portion 12a and rear end portion 12b, resilient clip body 12 has a pair of lever contact zones 16 that are both located between the forward end portion 12a and the arcuate rear portion 12b. As shown in FIGS. 1 and 2, and as also shown in FIG. 4, a pair of additional angled clip body segments 18 are located at or in the vicinity of front end portion 12a, forward of lever contact zones 16. Arcuate rear portion 12b it bowed outwardly (rearwardly) and therefore has a concave-inward shape, as will be described in more detail below. Front portion 12a, arcuate rear portion 12b, lever contact zones 16 and angled clip body segments 18 cooperate to define an article retaining chamber 20 that is capable of securing bundled articles such as loops of a cord 22, such as shown in FIG. 2. Resilient clip body 12 includes a set of rounded arm-receiving loops 24 at front portion 12a, which loops 24 pivotably receive and support respective proximal end portions 14b of lever arms 14.

In order to limit or prevent undesirable impingement or pinching or entrapment of wires, cables, or other articles disposed in retaining chamber 20 by resilient clip body 12, it will be observed that in the illustrated embodiments there are substantially no acute (less than 90-degree) angles formed along the continuous the interior surfaces of clip body 12, except in the case of the relatively large-radius curve of arcuate rear portion 12b. Although the arcuate rear portion 12b traces an arc extending over more than 90 degrees, it will be appreciated that the radius of curvature of arcuate rear portion 12b is substantially greater than the radii of the cords 22 for which clip 10 is intended, so as not to form a pinch-point or entrapment point along clip body 12 for cords 22. With further reference to FIGS. 1, 2, and 4, and in particular FIG. 7, it will be appreciated that first inwardly-facing transition angles 21 may be defined between arcuate rear portion 12b and each of the lever contact zones 16, and these first inwardly-facing transition angles are greater than 90-degrees for reasons explained above. Similarly, clip body 12 defines second inwardly-facing transition angles 23 between each lever contact zone 16 and the respective angled clip body segment 18, with each second inwardly-facing transition angle being greater than 90-degrees. The phrase "greater than 90-degrees" should be understood to mean that the measurement of the interior-facing angles would be greater than 90-degrees, or an obtuse angle, over which the actual bend angle of the clip body is less than 90-degrees as it transitions from one zone or region to the next.

Therefore, by having continuous interior surfaces that do not form any acute angle having a radius of curvature that is less than the radius of curvature of the cords 22 (or other articles) for which it is intended, pinch-points or entrapment-points are avoided in retaining chamber 20. It will be appreciated that front end portion 12a may form an acute angle facing inwardly toward chamber 20, where the clip body 12 opens and closes, which is a discontinuous region of clip body 12, and which has a sufficiently small radius of curvature when clip body 12 is closed so as to avoid any undesired entrapment of cords 22 or other articles for which that particular size of clip 10 is intended. Thus, the shape of clip body 12 is designed to limit or prevent undesired entrapment or pinching of bundled articles that are within a size range for which a particular size of clip body is intended.

Figure 7:
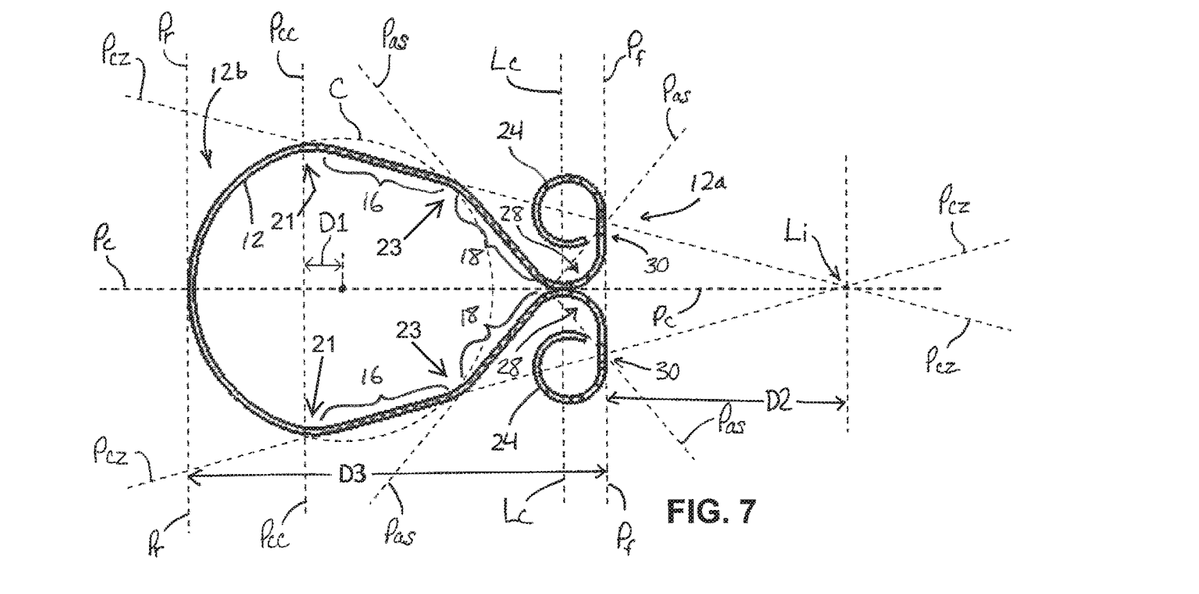
FIG. 7 is an annotated right side elevation of the resilient clip body of the clip of FIG. 1.

Lever arms 14 extend rearwardly from the clip body's forward end portion 12a and when the lever arms are lying against clip body 12 at lever contact zones 16, the lever arms 14 diverge apart from one another in the rearward direction. In the illustrated embodiment, clip body 12 is substantially symmetrical about a center plane Pc such as shown in FIG. 7, and lever arms 14 are arranged substantially symmetrically about center plane Pc when lying along lever contact zones 16 such as shown in FIGS. 1 and 2. In this configuration, the lever arms' distal end portions 14a extend or project rearwardly of the clip body's rearward-most portion which, in the illustrated embodiments, is located where arcuate rear end portion 12b is intersected by center plane Pc (FIG. 7).

In the illustrated embodiment of FIGS. 1 and 2, opposite sides of clip body 12 are biased inwardly toward center plane Pc at front end portion 12a so as to meet along a contact patch 25 (FIG. 2) that is centered at a contact line Lc, such as shown in FIG. 7. In this arrangement, the compressive force F is applied to distal end portions 14a of the respective lever arms 14 to form an opening 26 providing access to article retaining chamber 20, such as in the manner shown in FIG. 6. However, it is further envisioned that the resilient clip body may be configured to assume an open configuration, such as that of FIG. 6, when no compressive forces are applied to the lever arms 14. That is, in a relaxed state the front end portion 12a of clip body 12 may form opening 26, the opening having a desired or predetermined width, such as at least slightly less than the outer diameter of the cord 22, thereby retaining cord 22 in article retaining chamber 20 when little or no force is applied to the retaining cord 22, but permitting the retaining cord 22 to be drawn out of article retaining chamber 20 through opening 26 when sufficient force is applied to the cord in the forward direction away from retaining chamber 20 and toward opening 26. Such an arrangement may permit a user to draw a desired length of cord 22 from retaining chamber 20 and through opening 26 without applying compressive force to lever arms 14, and without drawing the entire length of cord 22 out of the retaining chamber. Such an arrangement may also permit the clip 10 to be secured to other articles having a thickness or diameter exceeding the width of opening 26 when clip body 12 is in its relaxed state.

Loops 24 are each spaced outwardly from center plane Pc by respective outwardly-curved regions 28 and respective generally planar outwardly-extending regions 30 of clip body 12, both regions 28, 30 being located forwardly of contact line Lc, such as shown in FIG. 7. Outwardly-extending regions 30 both lie in a common forward-most plane Pf and define the forward extent of clip body 12, and also define the forward extent of clip 10 when lever arms 14 are positioned rearwardly. Each loop 24 is intersected by a respective contact zone plane Pcz that extends through the respective lever contact zones 16 and, in the illustrated embodiment of FIG. 7, each loop 24 is approximately bisected by the respective contact zone plane Pcz. In addition, each loop 24 is located diagonally outboard and rearward of an angled segment plane Pas corresponding to the angled clip body segment 18 located on the opposite side of center plane Pc from that particular loop 24, and each loop 24 is substantially located diagonally outboard and forward of the angled segment plane Pas corresponding to the angled clip body segment 18 that is located on the same side of center plane Pc as that particular loop 24.

Arcuate rear portion 12b of the clip body is substantially in the shape of a horizontal cylindrical segment surface, which is defined as the shape of a rounded wall that results from cutting a hollow open-ended cylinder where it is intersected by a single plane that is oriented parallel to the cylinder's axis of symmetry. In the case of a hollow open-ended cylinder intersected by a single plane that is oriented along the cylinder's axis of symmetry, the resulting shape would be a horizontal semi-cylindrical segment surface. However, in the illustrated embodiment of FIG. 7, the single cylinder-cutting plane Pcc is spaced a first distance D1 from the center of a theoretical hollow open-ended cylinder C through which arcuate rear portion 12b can fit, such that arcuate rear portion 12b traces less than half of the circumference of cylinder C, such as shown in FIG. 7. As a result, the radius of curvature of arcuate rear portion 12b in the relaxed state is the same as the radius of cylinder C, and the maximum height of arcuate rear portion 12b, which is measured along cylinder-cutting plane Pcc, is slightly less than the diameter of cylinder C.

Lever contact zones 16 are angled inwardly toward center plane Pc from cylinder-cutting plane Pcc in the forward direction, and therefore lever contact zones 16 lie substantially within the cylinder C described above and shown in FIG. 7. The entirety of arcuate rear portion 12b is located entirely rearwardly of the entireties of both of the lever contact zones 16. A central region of the arcuate rear portion 12b is located along center plane Pc and contacts a rearward-most plane Pr that passes through this rearward extent of clip body 12, with this region and plane also defining the rearward extent of clip 10 when lever arms 14 are positioned in a certain outward positions or a forward position (not shown).

As further shown in FIG. 7, contact zone planes Pcz diverge from one another in the rearward direction (i.e., to the left as viewed in FIG. 7), and converge toward one another in the forward direction (i.e., to the right as viewed in FIG. 7) to an intersection line Li (which appears as a point in FIG. 7) where the contact zone planes Pcz also intersect center plane Pc. Intersection line Li is spaced well in front of the forward-most plane Pf of clip body 12 and, in the illustrated embodiment, the distance D2 is defined between forward-most plane Pf and intersection line Li. In addition, another distance D3 is measured between rearward-most plane Pr and forward-most plane Pf, with D3 representing the overall length of clip body 12 along center plane Pc. In the illustrated embodiment of FIG. 7, distance D3 is approximately 50% to 65% of the length of D2 with clip body 12 in the relaxed (fully closed) position of FIGS. 1, 2 and 7. However, it will be appreciated that variations in the lateral spacing of lever contact zones 16 (i.e., distance from center plane Pc) and the angles of contact zone planes Pcz relative to center plane Pc, can greatly affect the location of intersection line Li relative to forward-most plane Pf, and thus changing the length of distance D2.

In the embodiment of FIGS. 1 and 2, lever arms 14 rest along most or all or nearly the entire length of the respective lever contact zones 16 when clip body 12 is in its relaxed state, and may also maintain such contact during at least initial applications of compressive force F used to open the forward end portion 12a of clip body 12. This arrangement spreads loads across greater length portions of both lever arms 14 and of clip body 12 as compared to if each lever arm 14 only contacted clip body 12 at a single point or narrow area along the respective contact zone 16, and may reduce the likelihood that one or both lever arms 14, or the clip body 12, will be plastically deformed by the application of excessive compressive loads F to the distal end portions 14a of lever arms 14. However, due to at least elastic bending of lever arms 14 and/or clip body 12 during the application of compressive force F, it should be appreciated that the length, number, and location of contact areas between each lever arm 14 and the respective lever contact zone 16 may change according to the location, direction, and magnitude of the compressive force F.

Figure 3:
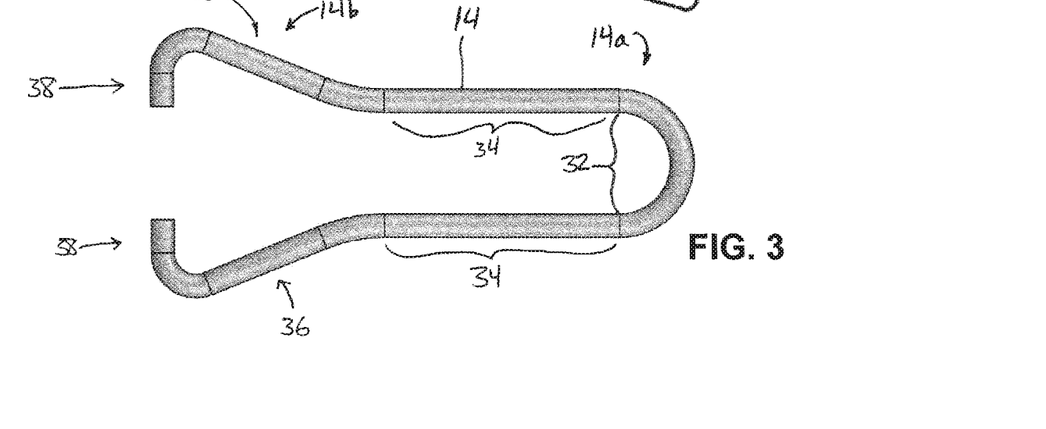
FIG. 3 is a top plan view of a lever arm of the clip of FIG. 1.
Figure 5:
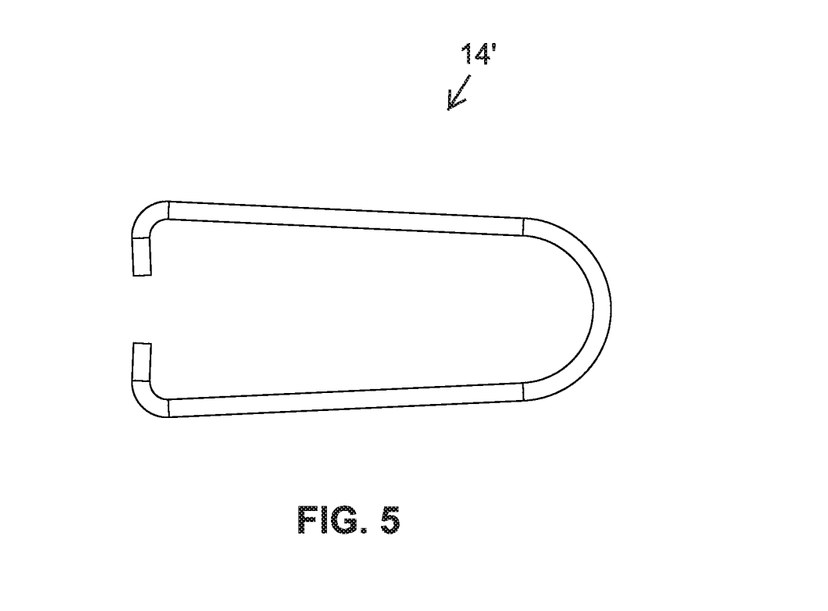
FIG. 5 is a top plan view of another lever arm for use with the resilient clip body of FIG. 4.

Referring now to FIG. 3, and as also shown in FIG. 5, each lever arm 14 includes a semi-circular curved region 32 at the distal end portion 14a, a pair of parallel arm sections 34 located proximally of the semi-circular curved region 32, a pair of outwardly-diverging arm sections 36 located proximally of the parallel arm sections 34, and a pair of inwardly-directed proximal tip portions 38 spaced apart from one another and located proximally of the outwardly-diverging arm sections 36. Proximal tip portions 38 are received in the loops 24 formed in clip body 12, and may be initially spread apart from one another, aligned with the respective loop 24, and released so that tip portions 38 are inserted into open ends of the loop 24 as lever arm 14 elastically returns to its shape as shown in FIG. 3. Other shapes of lever arm may be used without departing from the spirit and scope of the present invention, such as the lever arm 14' shown in FIG. 5, in which there is a curved rear region that is nearly semi-circular, two main arm sections that extend forwardly from the curved rear region and diverge apart from one another at a shallow angle, and terminate at a forward end with inwardly-directed proximal tip portions.

Resilient clip body 12 may be cut and formed from a sheet of spring steel, and heat treated as desired, to provide a desired final shape configuration and resilience. Lever arms 14 may be cut and formed from a spring steel wire, and heat treated as desired, to provide a desired final shape configuration and resilience. It will be appreciated that spring steel is just one of many materials that may be suitable for various applications, and that other metals and even non-metals may be sufficiently strong, resilient, and corrosion-resistant depending on the application including the expected operating environment, size, and other factors. In addition resilient clip body 12 may optionally be formed with additional ridges, contours, or variations in shape, such as to affect its resilience, the compressive force required to open the clip body, its ability to retain different types of materials, and other performance factors, without departing from the spirit and scope of the present invention.

Optionally, an alternative clip 10' for bundled articles may have substantially the same configuration as clip 10, except that in its relaxed state alternative clip 10' defines opening 26 at the forward end portion 12a' of its resilient clip body 12, without any compressive force being applied to lever arms 14'. Such an arrangement may facilitate uses and functionality not otherwise possible or readily accomplished with the clip 10 that does not define opening 26 unless compressive forces F are applied to its lever arms 14. Thus, alternative clip 10' may not be suitable for use in securing or attaching to articles that are thinner than the dimension of opening 26. In other respects, alternative clip 10' may be substantially the same or identical to clip 10, such that the details and functionality of alternative clip 10' may be readily understood with reference to the above descriptions.

Figure 8:
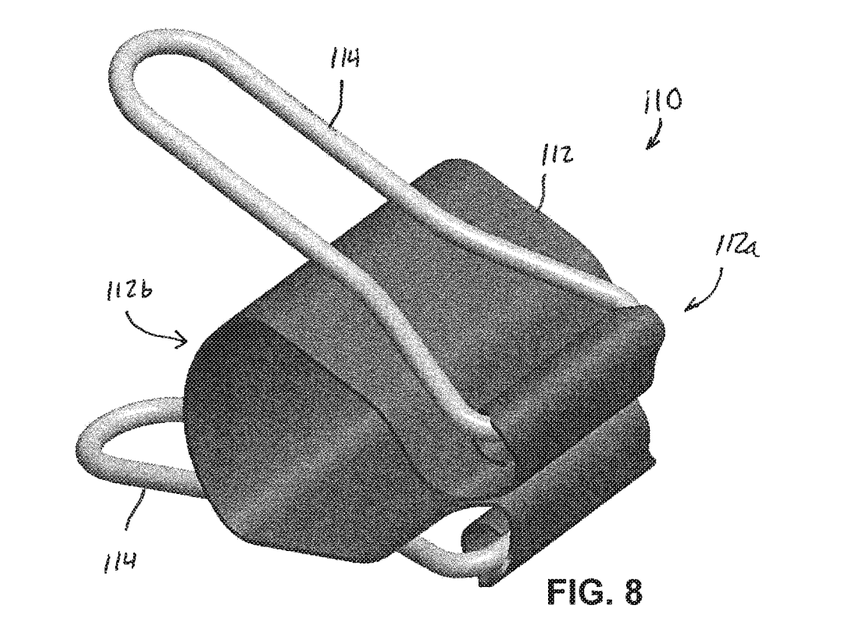
FIG. 8 is a perspective view of another clip for bundled articles in accordance with the present invention.
Figure 9:
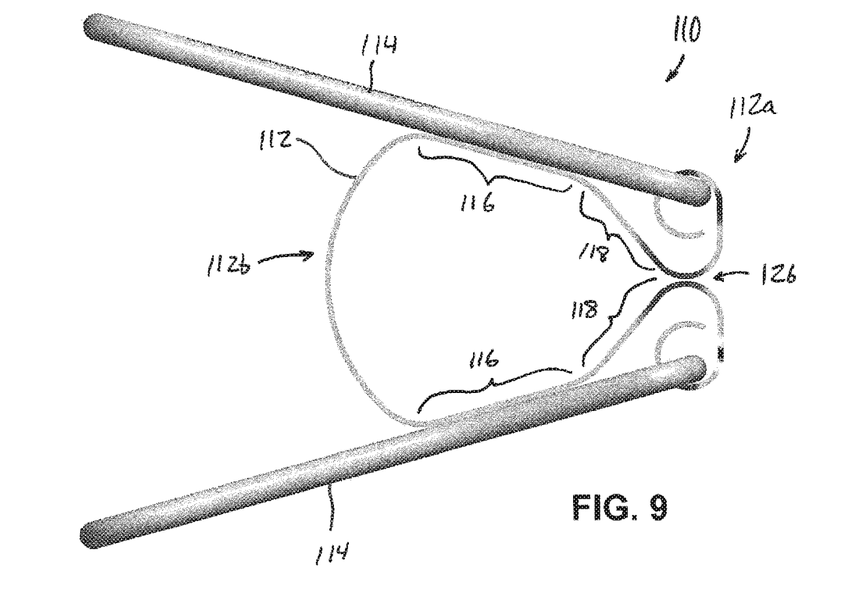
FIG. 9 is a right side elevation of the clip of FIG. 8.

Referring now to FIGS. 8 and 9, still another alternative clip 110 is shown which corresponds in many respects to clip 10 and alternative clip 10'. Alternative clip 110 includes a clip body 12 having a front end portion 112a and an arcuate rear end portion 112b, with front end portion 112a defining a smaller gap or opening 126 in its relaxed state, with no compressive forces applied to lever arms 114, as compared to the opening 26 of alternative clip 10'. In addition, the radius of curvature of arcuate rear end portion 112b is sufficiently large so that a cylinder (not shown) having the same radius and overlying rear end portion 112b, would encircle angled clip body segments 118 and at least portions of loops 124, in addition to encircling lever contact zones 116. In other respects, alternative clip 110 may be substantially the same or identical to clip 10, such that the details and functionality of alternative clip 110 may be readily understood with reference to the above descriptions.

Figure 10:
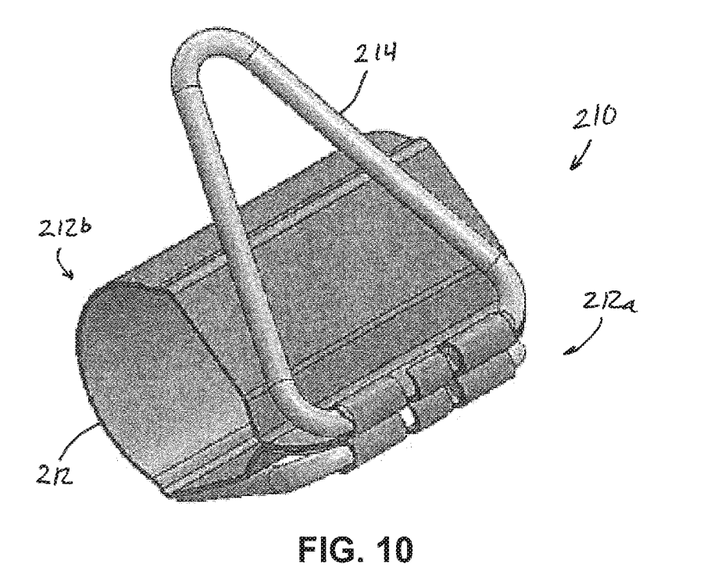
FIG. 10 is a perspective view of another clip for bundled articles in accordance with the present invention.
Figure 11:
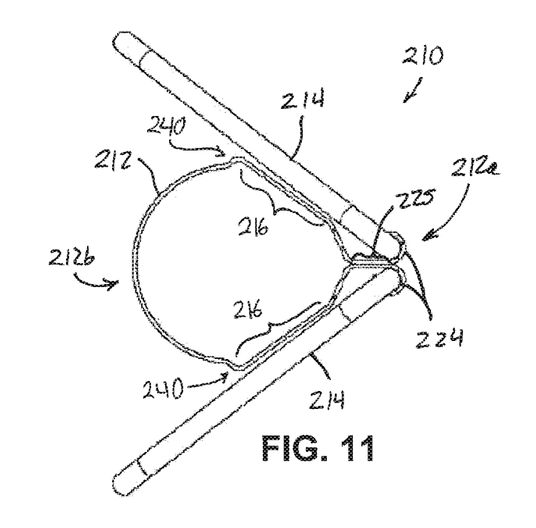
FIG. 11 is a right side elevation of the clip of FIG. 10.
Figure 12:
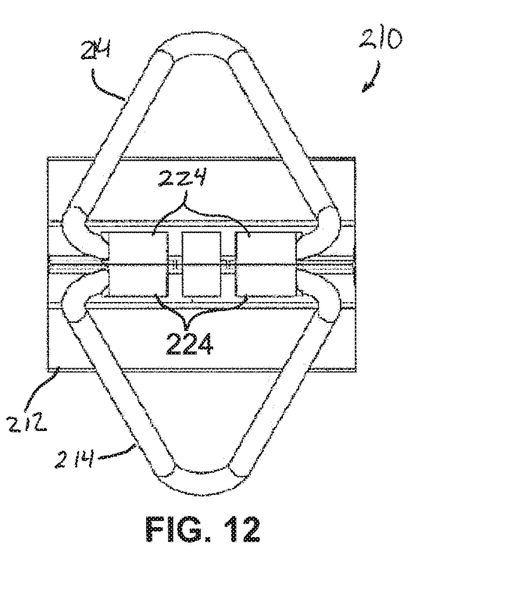
FIG. 12 is a front elevation of the clip of FIG. 10.

Optionally, and with reference to FIGS. 10-12, another alternative clip 210 is shown which has a generally planar rectangular contact patch 225 (FIG. 11) at a front end portion 212a of its resilient clip body 212, plus lever arms 214, lever contact zones 216, and loops 224 configured so that that lever arms 214 initially rest along forward end portions of lever contact zones 216 and then contact additional length of lever contact zones 216 as compressive force is applied to the distal (rearward) end portions 214a of the lever arms 214. A radially or laterally outwardly-extending ridge 240 is located between a rearward end of each lever contact zone 216 and the adjacent portion of an arcuate rear end portion 212b of clip body 212. In other respects, alternative clip 210 may be substantially similar to clip 10, such that other details and functionality of alternative clip 210 may be understood with reference to the above descriptions.

It is further envisioned that a clip having desired properties as described above may be formed of non-metal, such as resinous plastic, fiber-reinforced resinous plastic, or the like. A plastic clip may potentially be manufactured a lower cost due at least in part to fewer manufacturing steps, and may be molded in different colors and with surface patterns or indicia readily added in a mold, if desired. Referring to FIGS. 13-16, a plastic-bodied clip 310 includes a clip body 312 fitted with a pair of lever arms 314. Clip body 312 may be molded from various different resinous plastic materials according to a desired opening force, resistance to plastic deformation, hardness, and the like. For example, Hytrel® 7246 and Hytrel® 8238 thermoplastic elastomers, both available from E. I. Du Pont de Nemours & Co. of Wilmington, Del., may provide suitable properties.

It will be appreciated that clip body 312 is generally thicker than the spring steel or other metals that provide suitable material properties, and that other minor shape variations may be selected to achieve desired performance. However, in most respects the plastic-bodied clip 310 is substantially similar to the above-described clip 10, with the various regions and components of plastic-bodied clip 310 that are substantially similar to regions and components of metal-bodied clip 10 are given like numerals by the addition of 300, such that the regions and components may be readily understood with reference to the above descriptions, including the various planes and regions described with reference to FIG. 7, which are substantially equally applicable with reference to FIG. 14.

Figure 13:
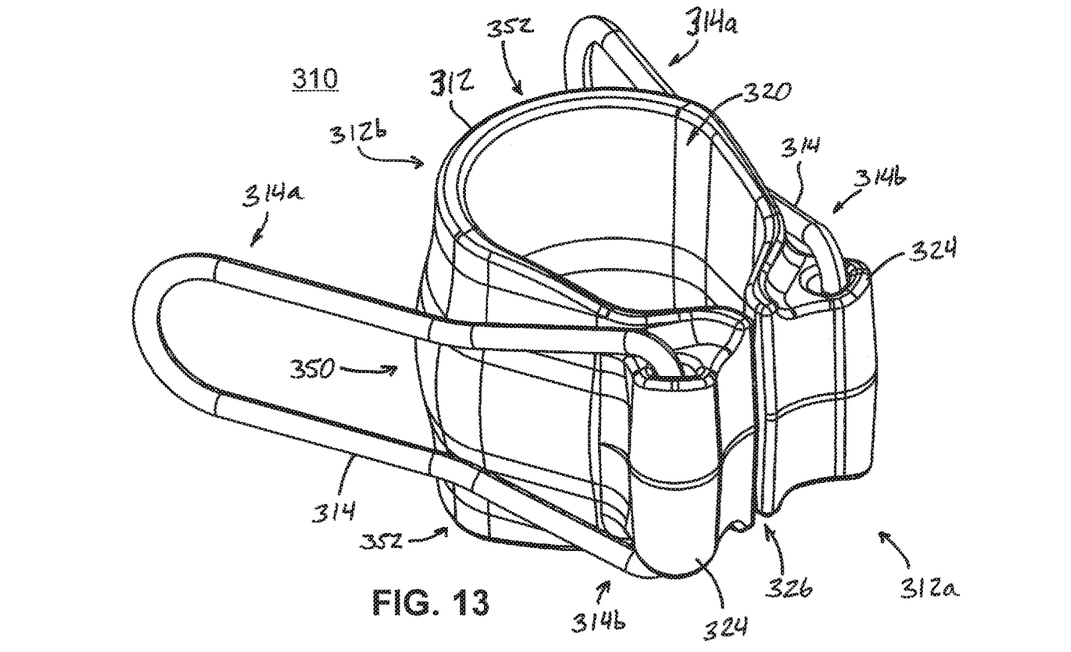
FIG. 13 is a perspective view of another clip for bundled articles in accordance with the present invention.
Figure 14:
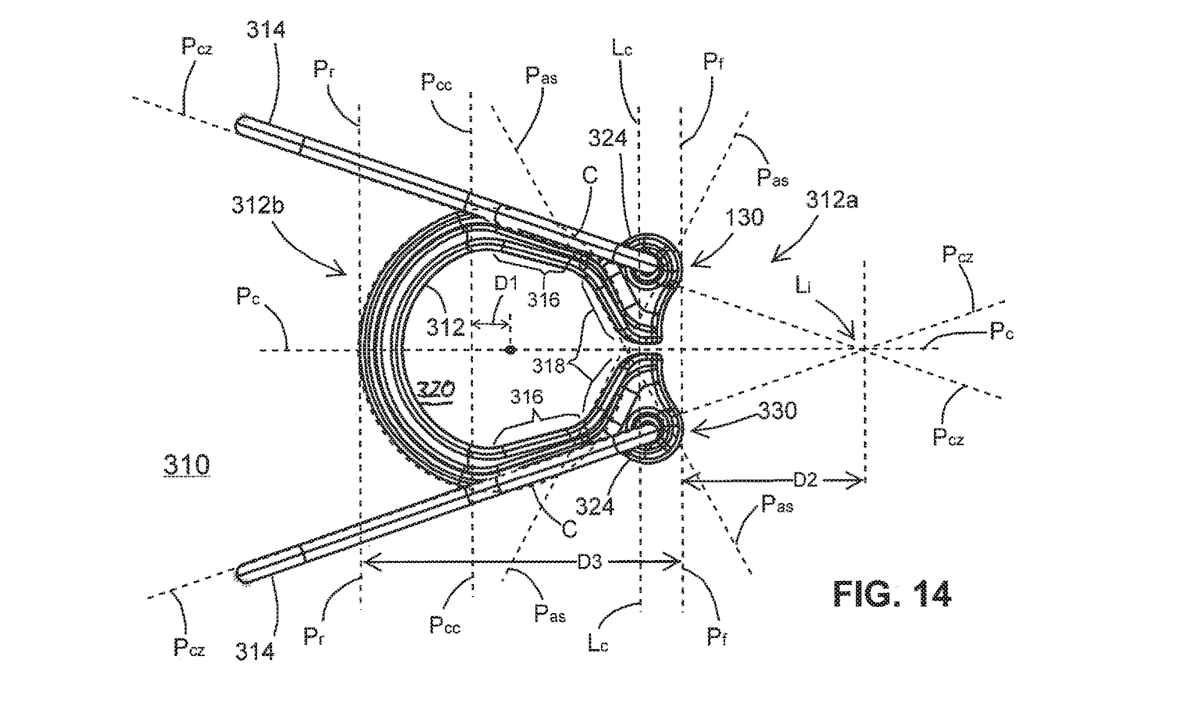
FIG. 14 is an annotated right side elevation of the resilient clip of FIG. 13.
Figure 15:
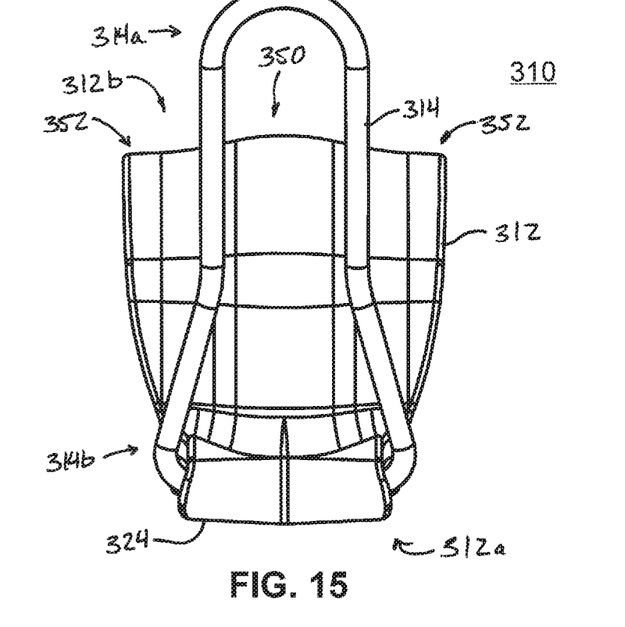
FIG. 15 is a top plan view of the resilient clip of FIG. 13.
Figure 16:
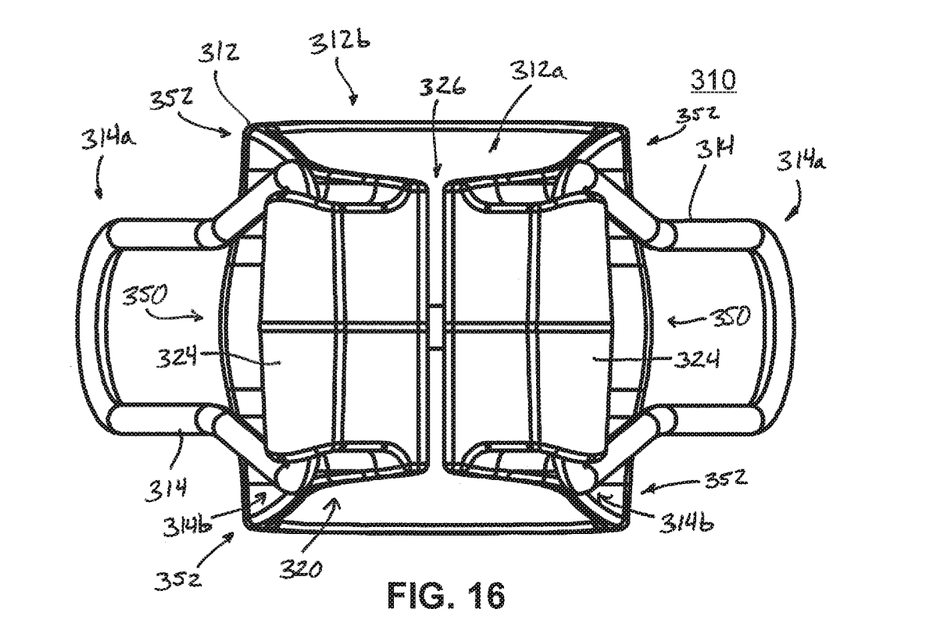
FIG. 16 is a front elevation of the resilient clip of FIG. 13.

To enhance strength and resilience of the plastic clip body 312, the clip body is formed with a thicker middle region 350 extending around substantially the entire portion of clip body 312 that is rearward of the arm-receiving loops 324 formed at front portion 312a of the clip body, including along rear end portion 312b, such as shown in FIGS. 13, 15 and 16. Thicker middle region 350 is located between a pair of thinner outboard edge regions 352, with smooth transitions from middle region 350 to edge regions 352, as best shown in FIG. 15. The shape of middle region 350 may provide a stabilizing and centering function for the lever arms 314, with middle region 350 forming a bulge that may extend at least a small distance into a space defined between the respective wire elements of each lever arm 314 as the lever arms 314 are pinched together under a compressive or squeezing force. Optionally, it is envisioned that lever arms may be integrally formed with the plastic clip body, extending rearwardly from the rear portion of the clip body and obviating the need for separate lever arms.

Thus, the clip of the present invention provides a convenient and repeatedly reusable device that can be used in a one-handed manner for securing various types of articles that a user may wish to secure together on at least a temporary basis, such as lengths and/or loops of cord, rope, or wire, for example. In addition to maintaining such articles in an organized and substantially untangled manner, the clips may also facilitate securing those articles to a table edge or other surface, such as to maintain the articles in an unobtrusive location, and may further permit or facilitate a user manually drawing desired amounts of the bundled materials from the clip. The clips may be particularly useful for organizing cords or cables associated with electronic devices including headphone wires and charging cables for personal electronic devices. The clips also are useful for at least temporarily organizing and securing wires in work areas and/or display areas where there is a need for routing wires or other materials around furniture and through designated or desired pathways, such as for aesthetic or safety reasons.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A clip for bundled articles, said clip comprising:
a resilient clip body having a forward end portion, an arcuate rear portion, and a pair of lever contact zones disposed between said forward end portion and said arcuate rear portion, wherein said arcuate rear portion has a concave-inward shape and said forward end portion at least selectively defines an opening, wherein said lever contact zones are substantially planar, and wherein respective planes extending through said lever contact zones intersect at a location that is spaced in front of a forward-most surface of said resilient clip body;
an article-retaining chamber defined by said arcuate rear portion and said pair of lever contact zones; and
a pair of lever arms coupled to said clip body and having respective distal end portions extending rearwardly in divergent directions beyond said arcuate rear portion of said clip body;
wherein said forward end portion of said clip body comprises a pair of loops defining rounded openings for receiving proximal end portions of respective ones of said pair of lever arms, and wherein the planes extending through said lever contact zones intersect central regions of respective ones of said rounded openings;
wherein said lever arms contact said clip body along respective ones of said lever contact zones, and are operable to move said forward end portion of said clip body to an open configuration upon application of an inwardly compressive force to said distal end portions of said lever arms toward one another, and wherein said forward end portion of said clip body is resiliently biased to a closed configuration upon release of the inwardly compressive force.

2. The clip of claim 1, wherein a central region of said arcuate rear portion is located rearwardly of both of said lever contact zones.

3. The clip of claim 1, wherein said article-retaining chamber defined by said arcuate rear portion is shaped as a cylindrical segment.

4. The clip of claim 3, wherein said clip body is substantially symmetrical about a central plane, and wherein said arcuate rear portion defines a radius of curvature that is greater than a maximum distance by which each of said lever contact zones is spaced from the central plane.

5. The clip of claim 3, wherein said lever contact zones lie substantially inside a cylinder traced through and partially defined by the cylindrical segment of said arcuate rear portion.

6. The clip of claim 1, wherein a first distance is defined between said forward-most surface of said clip body and the location where the respective planes extending through said lever contact zones intersect, wherein a second distance is defined between a rearward-most surface of said clip body and said forward-most surface of said clip body, and wherein said first distance is at least one-half of said second distance.

7. The clip of claim 1, wherein each of said lever arms contacts said clip body along substantially the full length of each of said respective ones of said lever contact zones at least when said clip body is in said closed configuration.

8. The clip of claim 7, wherein each of said lever arms contacts said clip body along substantially the full length of each of said respective ones of said lever contact zones when said clip body is both said open configuration and said closed configuration.

9. The clip of claim 1, wherein when said forward end portion of said clip body is in the closed configuration and said lever arms are unloaded, respective sides of said clip body at said forward end portion are spaced apart from one another and define a gap therebetween, wherein said gap provides access to said article-retaining chamber.

10. The clip of claim 1, wherein each of said lever arms is independently pivotable relative to said clip body.

11. The clip of claim 10, wherein each of said lever arms comprises a semi-circular curve at said distal end portion, a pair of parallel arm sections located proximally of said semi-circular curve, a pair of outwardly-diverging arm sections located proximally of said parallel arm sections, and a pair of inwardly-directed proximal tip portions spaced apart from one another and located proximally of said outwardly-diverging arm sections.

12. The clip of claim 1, wherein first inwardly-facing transition angles are defined between said arcuate rear portion and each of said lever contact zones, and wherein said first inwardly-facing transition angles are greater than 90-degrees.

13. The clip of claim 12, wherein said clip body further comprises an angled clip body segment positioned forwardly of each of said lever contact zones, wherein second inwardly-facing transition angles are defined between each of said lever contact zones and a respective one of said angled clip body segments, and wherein said second inwardly-facing transition angles are greater than 90-degrees.

14. A clip for bundled articles, said clip comprising:
a resilient clip body having a forward end portion defining a gap when in a relaxed state, an arcuate rear portion having a concave-inward shape, and a pair of lever contact zones disposed between said forward end portion and said arcuate rear portion, wherein said lever contact zones lie substantially inside a cylinder traced through and partially defined by a cylindrical segment of said arcuate rear portion;
an article-retaining chamber defined by said arcuate rear portion, wherein said gap defines a passageway to said article-retaining chamber; and
a pair of lever arms extending rearwardly from said forward end portion of said clip body in divergent directions, said lever arms having respective distal end portions extending rearwardly beyond said arcuate rear portion of said clip body;
wherein said lever arms are operable to move said forward end portion of said clip body to an open configuration upon application of an inwardly compressive force to said distal end portions of said lever arms, and wherein said forward end portion of said clip body is resiliently biased to the relaxed state upon release of the inwardly compressive force.

15. The clip of claim 14, wherein said resilient clip body comprises resinous plastic.

16. The clip of claim 15, wherein said resilient clip body comprises a middle region and a pair of edge regions on opposite sides of said middle region, wherein said middle region is thicker than said edge regions along at least said arcuate rear portion.

17. The clip of claim 15, wherein said lever arms are pivotably coupled to said forward end portion of said resilient clip body, and said resilient clip body comprises a pair of lever contact zones disposed between said forward end portion and said arcuate rear portion, wherein said lever arms contact said resilient clip body along respective ones of said lever contact zones.

18. A clip for bundled articles, said clip comprising:
a resilient clip body having a forward end portion, an arcuate rear portion, and a pair of lever contact zones disposed between said forward end portion and said arcuate rear portion, wherein said arcuate rear portion has a concave-inward shape and said forward end portion at least selectively defines an opening, and wherein said lever contact zones lie substantially inside a cylinder traced through and partially defined by a cylindrical segment of said arcuate rear portion;
an article-retaining chamber defined by said arcuate rear portion and said pair of lever contact zones; and
a pair of lever arms coupled to said clip body and having respective distal end portions extending rearwardly in divergent directions beyond said arcuate rear portion of said clip body;
wherein said lever arms contact said clip body along respective ones of said lever contact zones, and are operable to move said forward end portion of said clip body to an open configuration upon application of an inwardly compressive force to said distal end portions of said lever arms toward one another, and wherein said forward end portion of said clip body is resiliently biased to a closed configuration upon release of the inwardly compressive force.

19. The clip of claim 18, wherein a first distance is defined between a forward-most surface of said clip body and a location where respective planes extending through said lever contact zones intersect, wherein a second distance is defined between a rearward-most surface of said clip body and said forward-most surface of said clip body, and wherein said first distance is at least one-half of said second distance.

20. The clip of claim 19, wherein said clip body is substantially symmetrical about a central plane, and wherein said arcuate rear portion defines a radius of curvature that is greater than a maximum distance by which each of said lever contact zones is spaced from the central plane.

* * * * *